(No Model.)
S. BONSER.
Portable Force Pump.
No. 238,333. Patented March 1, 1881.
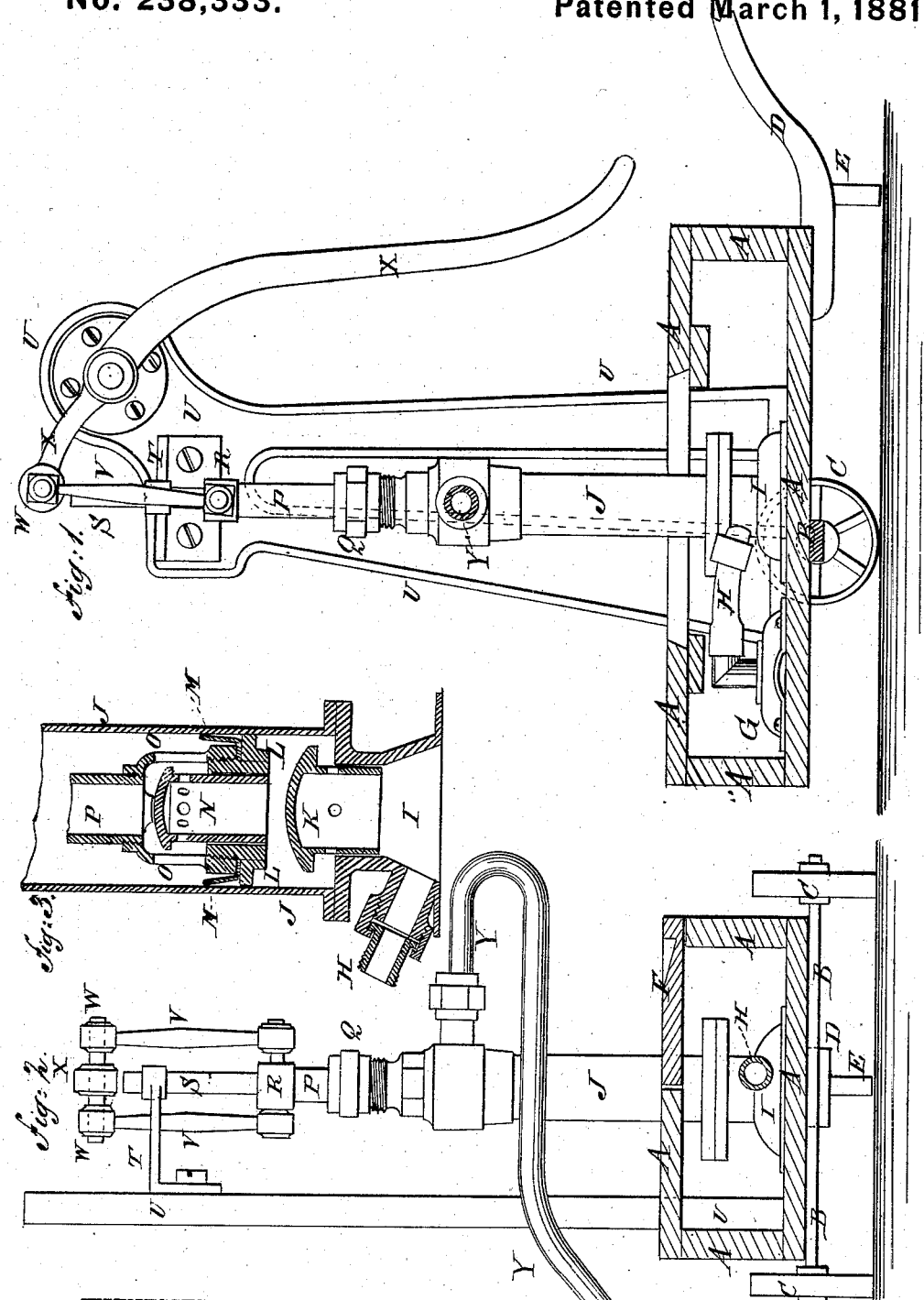
WITNESSES:
Chas. Nida.
C. Sedgwick
INVENTOR:
S. Bonser
BY Munn & Co.
ATTORNEYS.

UNITED STATES PATENT OFFICE.

SAMUEL BONSER, OF DOVER, NEW HAMPSHIRE.

PORTABLE FORCE-PUMP.

SPECIFICATION forming part of Letters Patent No. 238,333, dated March 1, 1881.

Application filed July 10, 1880. (No model.)

*To all whom it may concern:*

Be it known that I, SAMUEL BONSER, of Dover, in the county of Strafford and State of New Hampshire, have invented a new and useful Improvement in Portable Force-Pumps, of which the following is a specification.

Figure 1 is a sectional side elevation of the improvement. Fig. 2 is a sectional end elevation. Fig. 3 is a sectional elevation of the lower part of the pump.

Similar letters of reference indicate corresponding parts.

The object of this invention is to furnish portable force-pumps for extinguishing fires, washing windows, wetting the roofs of buildings, sprinkling grass-plots, plants, and trees with water or other liquids, and which shall be so constructed that they can be readily moved from place to place.

A represents a water-tight box or tank, to the bottom of which, a little in the rear of its center, is attached the axle B of the wheels C.

To the forward part of the bottom of the tank A is attached a handle, D, which curves upward and outward, and has a leg, E, attached to it at or near the forward end of the said tank A, so that the tank will stand steady while the pump is being used. A part, F, of the top of the tank A is made detachable or hinged for convenience in putting in water or other liquid.

To the bottom of the tank A is attached a strainer, G, to prevent coarse substances from being drawn into the pump. With the top or cover of the strainer G is connected one end of a rubber or other suitable pipe, H, the other end of which is connected, by a coupling or other suitable means, with the water-chamber I, attached to the bottom of the tank A.

To the top of the water-chamber I is attached the lower end of the pump-cylinder J. The upper part of the cavity of the water-chamber I is made smaller than the cavity of the pump-cylinder J, to form a shoulder to serve as a seat for the flange formed around the upper end of the valve K. The valve K is made in the form of a hollow cylinder or tube with a closed upper end, and with a number of holes in the upper part of its sides.

L is the piston, which fits into the cylinder J, and is provided with a leather or other suitable packing, M, to make the said piston work water-tight within the said cylinder. The piston L is made ring-shaped to receive the valve N, which is made in the shape of a hollow cylinder with a closed upper end, with holes in the upper part of its sides, and with a ring-flange around its upper end to rest upon the top of the inner part of the piston L as a seat.

To the piston L is attached a frame or basket, O, the top of which is attached to the lower end of the piston-rod or plunger P. The plunger P is made hollow, to adapt it to serve as an air-chamber, and passes up through a stuffing-box, Q, in the upper end of the pump-cylinder J.

To the upper end of the piston-rod P is attached a cross-head, R, to the center of which and in line with the plunger P is attached a guide-rod, S. The guide-rod S slides up and down through a guide hole or bearing in the outer end of an arm or bracket, T, attached to the standard or frame U, the lower part of which is firmly attached to the tank A.

To the ends of the cross-head R are pivoted the lower ends of two connecting-rods, V, the upper ends of which are pivoted to the ends of a cross-head, W, attached to the end of the lever X. The lever X, at a little distance from its forward end, is pivoted to a gudgeon attached to the standard or frame U.

With an opening in the upper part of the pump-cylinder is connected, by a union or other suitable coupling, the end of a rubber pipe, Y, or other suitable flexible pipe, which has a nozzle and a sprinkler, Z, attached to its other end, whereby the water or other liquid discharged from the pump can be directed as may be required.

The leg E is designed to be made with a stirrup or foot-rest to receive the foot of the operator, so that he can hold the machine steady while working the pump.

Having thus described my invention, what I claim as new, and desire to secure by Letters Patent, is—

1. A portable force-pump constructed substantially as herein shown and described, consisting of the tank A F, provided with an axle and wheels B C, and a handle and leg, D E, the strainer G, the connecting-pipe H, the water-chamber I, the pump-cylinder J, the lower valve, K, the ring-piston L, having packing M, the upper valve, N, the connecting frame or basket O, the hollow piston-rod P, the crosshead and guide-rod R S, the connecting-rods V, the lever and cross-head X W, the guide-arm T, the supporting standard or frame U, and the pipe and nozzle Y Z, as set forth.

2. The combination, with the tank A and cylinder J, of the strainer G, pipe H, and water-chamber I, having valve K, as and for the purpose specified.

SAMUEL BONSER.

Witnesses:
ELBRIDGE SMITH,
HORATIO G. HANTON.